(12) United States Patent
Kwag (10) Patent No.: US 11,824,175 B2
(45) Date of Patent: *Nov. 21, 2023

(54) BATTERY MODULE

(71) Applicant: SAMSUNG SDI CO., LTD., Yongin-si (KR)

(72) Inventor: Nohyun Kwag, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,759

(22) Filed: Sep. 26, 2022

(65) Prior Publication Data

US 2023/0017691 A1 Jan. 19, 2023

Related U.S. Application Data

(63) Continuation of application No. 16/633,663, filed as application No. PCT/KR2018/007217 on Jun. 26, 2018, now Pat. No. 11,462,798.

(30) Foreign Application Priority Data

Jul. 27, 2017 (KR) ......................... 10-2017-0095710

(51) Int. Cl.
*H01M 50/213* (2021.01)
*H01M 10/613* (2014.01)
(Continued)

(52) U.S. Cl.
CPC ..... *H01M 10/613* (2015.04); *H01M 10/6554* (2015.04); *H01M 10/6556* (2015.04);
(Continued)

(58) Field of Classification Search
CPC ........... H01M 10/613; H01M 10/6554; H01M 10/6556; H01M 50/50
See application file for complete search history.

(56) References Cited

U.S. PATENT DOCUMENTS

| 7,671,565 B2 | 3/2010 | Straubel et al. |
| 7,923,144 B2 | 4/2011 | Kohn et al. |
(Continued)

FOREIGN PATENT DOCUMENTS

| CN | 200959354 Y | 10/2007 |
| CN | 102263214 A | 11/2011 |
(Continued)

OTHER PUBLICATIONS

European Office action dated Oct. 21, 2022.
(Continued)

*Primary Examiner* — James Lee
(74) *Attorney, Agent, or Firm* — Lee IP Law, P.C.

(57) ABSTRACT

An embodiment of the present disclosure provides a battery module including: battery cells including negative and positive electrodes on the same side; a first conductive plate provided at end portions of the battery cells and adjacent to the negative and positive electrodes, the first conductive plate including first through-holes through which the negative and positive electrodes are respectively exposed and first stepped portions which are adjacent to the first through-holes and recessed toward the battery cells; an insulative plate arranged on the first conductive plate and including second through-holes which at least partially overlap the first through-holes; a second conductive plate on the insulative plate, the second conductive plate including third through-holes which at least partially overlap the second through-holes and second stepped portions which are adjacent to the third through-holes and recessed toward the insulative plate; first connection tabs electrically connecting the positive electrodes or the negative electrodes to the first stepped portions; and second connection tabs electrically connecting the others of the positive electrodes and the negative electrodes to the second stepped portions.

1 Claim, 10 Drawing Sheets

(51) Int. Cl.
*H01M 10/6554* (2014.01)
*H01M 10/6556* (2014.01)
*H01M 50/50* (2021.01)
*H01M 50/55* (2021.01)
*H01M 50/559* (2021.01)
*H01M 50/514* (2021.01)
*H01M 50/503* (2021.01)
*H01M 50/583* (2021.01)
*H01M 50/593* (2021.01)
*H01M 50/588* (2021.01)
*H01M 50/502* (2021.01)
*H01M 50/543* (2021.01)

(52) U.S. Cl.
CPC ......... *H01M 50/213* (2021.01); *H01M 50/50* (2021.01); *H01M 50/502* (2021.01); *H01M 50/503* (2021.01); *H01M 50/514* (2021.01); *H01M 50/543* (2021.01); *H01M 50/55* (2021.01); *H01M 50/559* (2021.01); *H01M 50/583* (2021.01); *H01M 50/588* (2021.01); *H01M 50/593* (2021.01)

(56) References Cited

U.S. PATENT DOCUMENTS

| | | | |
|---|---|---|---|
| 7,998,611 | B2 | 8/2011 | Yoshihara et al. |
| 8,241,772 | B2 | 8/2012 | Hermann et al. |
| 8,263,250 | B2 | 9/2012 | Hermann |
| 8,389,139 | B2 | 3/2013 | Hermann et al. |
| 8,541,127 | B2 | 9/2013 | Tennessen et al. |
| 8,647,763 | B2 | 2/2014 | Tennessen et al. |
| 11,462,798 | B2 * | 10/2022 | Kwag ................ H01M 50/507 |
| 2005/0110458 | A1 | 5/2005 | Seman, Jr. et al. |
| 2010/0136391 | A1 | 6/2010 | Prilutsky et al. |
| 2011/0091760 | A1 | 4/2011 | Straubel et al. |
| 2011/0104549 | A1 | 5/2011 | Kim |
| 2011/0212356 | A1 | 9/2011 | Tennessen et al. |
| 2011/0293998 | A1 | 12/2011 | Sato et al. |
| 2012/0251857 | A1 | 10/2012 | Neuhold et al. |
| 2013/0196184 | A1 | 8/2013 | Faass et al. |
| 2014/0255748 | A1 | 9/2014 | Jan et al. |
| 2015/0325824 | A1 | 11/2015 | Hasegawa et al. |
| 2015/0380713 | A1 | 12/2015 | Kimura et al. |
| 2016/0073506 | A1 | 3/2016 | Coakley et al. |
| 2016/0315304 | A1 | 10/2016 | Biskup |
| 2018/0108895 | A1 | 4/2018 | Fees et al. |
| 2018/0261823 | A1 | 9/2018 | Jan et al. |
| 2019/0280267 | A1 | 9/2019 | Bae et al. |

FOREIGN PATENT DOCUMENTS

| | | |
|---|---|---|
| CN | 102598350 A | 7/2012 |
| CN | 105229820 A | 1/2016 |
| CN | 205564866 U | 9/2016 |
| CN | 106169546 A | 11/2016 |
| CN | 106711383 A | 5/2017 |
| CN | 106920905 A | 7/2017 |
| JP | 2007-508681 A | 4/2007 |
| JP | 2010-282811 A | 12/2010 |
| JP | 5127154 B2 | 11/2012 |
| JP | 2014-154337 A | 8/2014 |
| JP | 2016-516273 A | 6/2016 |
| KR | 10-2011-0046803 A | 5/2011 |
| KR | 10-2017-0040384 A | 4/2017 |
| KR | 10-2018-0066683 A | 6/2018 |

OTHER PUBLICATIONS

CN 106169546 A (11/302016), English machine translation by EPO (Year—2016).
International Search Report dated Oct. 2, 2018 for PCT/KR2018/007217.
Korean Office action dated Aug. 30, 2021.
European Search Report dated May 17, 2021.

* cited by examiner

BATTERY MODULE

CROSS-REFERENCE TO RELATED APPLICATIONS

This application is a continuation of pending U.S. application Ser. No. 16/633,663, filed on Jan. 24, 2020, the entire contents of which is hereby incorporated by reference; U.S. application Ser. No. 16/633,663 is the U.S. national phase of PCT Application No. PCT/KR2018/007217, filed Jun. 26, 2018, which is based on Korean Patent Application No. 10-2017-0095710, filed on Jul. 27, 2017, the entire contents of all of which being hereby incorporated by reference.

TECHNICAL FIELD

Embodiments of the present disclosure relate to battery modules.

BACKGROUND ART

Unlike non-rechargeable primary batteries, secondary batteries are rechargeable, and high-power secondary batteries using high-energy-density non-aqueous electrolyte have recently been developed.

In general, secondary barriers (hereinafter referred to as "battery cells") are used as energy sources for mobile devices, electric vehicles, hybrid vehicles, or other electric devices, and such battery cells may be modified according to the types of devices to which the battery cells are applied.

For example, small portable electric devices such as cellular phones or laptop computers may be operated for a certain period of time by using the power and capacity of only one or several battery cells. However, battery modules each including several tens to several hundreds of electrically connected battery cells to increase power and capacity may be used for devices that require high power and have long operation times, such as electric bicycles, hybrid vehicles, and electric vehicles.

Battery modules each including several tens to several hundreds of battery cells are operated for a relatively long period of time while being repeatedly charged and discharged, and thus it is necessary to stably maintain the mechanical and electrical connection between battery cells of battery modules.

The above-described background art is technical information that the inventor had or learned when or while deriving embodiments of the present disclosure and may not have been publicly known before the filing of the present application.

DESCRIPTION OF EMBODIMENTS

Technical Problem

Embodiments of the present disclosure provide mechanically and electrically stable battery modules.

Solution to Problem

An embodiment of the present disclosure provides a battery module including: a plurality of battery cells including negative and positive electrodes on one side; a first conductive plate provided at end portions of the plurality of battery cells and adjacent to the negative and positive electrodes, the first conductive plate including first through-holes through which the negative and positive electrodes of the plurality of battery cells are respectively exposed and first stepped portions which are adjacent to the first through-holes and are recessed toward the plurality of battery cells; an insulative plate arranged on the first conductive plate and including second through-holes which at least partially overlap the first through-holes; a second conductive plate arranged on the insulative plate, the second conductive plate including third through-holes which at least partially overlap the second through-holes and second stepped portions which are adjacent to the third through-holes and are recessed toward the insulative plate; first connection tabs electrically connecting the positive electrodes or the negative electrodes to the first stepped portions; and second connection tabs electrically connecting the others of the positive electrodes and the negative electrodes to the second stepped portions.

Advantageous Effects of Disclosure

Embodiments of the present disclosure provide battery modules configured to be mechanically and electrically stable by preventing the deformation or fracture of connection tabs that connect battery cells to conductive plates.

Furthermore, in the battery modules of the embodiments of the present disclosure, a structure for cooling battery cells are arranged on lower sides of the battery cells, and thus the spatial efficiency of the battery modules may be improved.

However, the scope of the present disclosure is not limited to these effects.

BEST MODE

An embodiment of the present disclosure provides a battery module including: a plurality of battery cells including negative and positive electrodes on one side; a first conductive plate provided at end portions of the plurality of battery cells and adjacent to the negative and positive electrodes, the first conductive plate including first through-holes through which the negative and positive electrodes of the plurality of battery cells are respectively exposed and first stepped portions which are adjacent to the first through-holes and are recessed toward the plurality of battery cells; an insulative plate arranged on the first conductive plate and including second through-holes which at least partially overlap the first through-holes; a second conductive plate arranged on the insulative plate, the second conductive plate including third through-holes which at least partially overlap the second through-holes and second stepped portions which are adjacent to the third through-holes and are recessed toward the insulative plate; first connection tabs electrically connecting the positive electrodes or the negative electrodes to the first stepped portions; and second connection tabs electrically connecting the others of the positive electrodes and the negative electrodes to the second stepped portions.

In the embodiment, one of the positive and negative electrodes of each of the plurality of battery cells may be located in a center region of the end portion of the battery cell, and the other of the positive and negative electrodes may be located in a peripheral region of the end portion of the battery cell.

In the embodiment, the first connection tabs, which electrically connect the plurality of battery cells to the first conductive plate, and the second connection tabs, which electrically connect the plurality of battery cells to the second conductive plate, may be fusible links such that when an excessive current flows, the first connection tabs and the second connection tabs may melt and break electrical connection between the plurality of battery cells and the first conductive plate and electrical connection between the plurality of battery cells and the second conductive plate.

In the embodiment, the battery module may further include a cooling member provided at the other end portions of the plurality of battery cells which are opposite the end portions of the plurality of battery cells with the plurality of battery cells therebetween.

In the embodiment, the cooling member may include a thermally conductive plate.

In the embodiment, the cooling member may include a flow path through which a cooling fluid flows.

In the embodiment, the plurality of battery cells may include a plurality of first sub-battery cells and a plurality of second sub-battery cells; the first conductive plate may include a first-first conductive plate overlapping the plurality of first sub-battery cells and a first-second conductive plate overlapping the plurality of second sub-battery cells; and the second conductive plate may correspond to the plurality of first sub-battery cells and the plurality of second sub-battery cells.

In the embodiment, the first connection tabs may connect the positive electrodes of the plurality of first sub-battery cells to the first stepped portions of the first-first conductive plate, and may connect the negative electrodes of the plurality of first sub-battery cells to the first stepped portions of the first-second conductive plate.

In the embodiment, the second connection tabs may connect the negative electrodes of the plurality of first sub-battery cells to the second stepped portions of the second conductive plate, and may connect the positive electrodes of the plurality of second sub-battery cells to the second stepped portions of the second conductive plate.

In the embodiment, the plurality of battery cells may include a plurality of first sub-battery cells, a plurality of second sub-battery cells, a plurality of third sub-battery cells, and a plurality of fourth sub-battery cells; the first conductive plate may include a first-first conductive plate overlapping the plurality of first sub-battery cells, a first-second conductive plate overlapping the plurality of second sub-battery cells and the plurality of third sub-battery cells, and a first-third conductive plate overlapping the plurality of fourth sub-battery cells; and the second conductive plate may include a second-first conductive plate corresponding to the plurality of first sub-battery cells and the plurality of second sub-battery cells, and a second-second conductive plate corresponding to the plurality of third sub-battery cells and the plurality of fourth sub-battery cells.

In the embodiment, the first connection tabs may connect: the positive electrodes of the plurality of first sub-battery cells to the first stepped portions of the first-first conductive plate; the negative electrodes of the plurality of second sub-battery cells to the first stepped portions of the first-second conductive plate; the positive electrodes of the plurality of third sub-battery cells to the first stepped portions of the first-second conductive plate; and the negative electrodes of the plurality of fourth sub-battery cells to the first stepped portions of the first-third conductive plate.

In the embodiment, the second connection tabs may connect: the negative electrodes of the plurality of first sub-battery cells to the second stepped portions of the second-first conductive plate; the positive electrodes of the plurality of second sub-battery cells to the second stepped portions of the second-first conductive plate; the negative electrodes of the plurality of third sub-battery cells to the second stepped portions of the second-second conductive plate; and the positive electrodes of the plurality of fourth sub-battery cells to the second stepped portions of the second-second conductive plate.

Other aspects, features, and advantages will become apparent and will be more readily appreciated from the accompanying drawings, claims, and detailed description.

Mode of Disclosure

The present disclosure may be variously modified, and various embodiments may be provided according to the present disclosure. Hereinafter, some embodiments will be illustrated in the accompanying drawings and described in detail. Effects and features of the present disclosure, and implementation methods thereof will be clarified through the following embodiments described in detail with reference to the accompanying drawings. However, the scope and idea of the present disclosure are not limited to the following embodiments but may be implemented in various forms.

In the following embodiments, it will be understood that although terms such as "first" and "second," are used to describe various elements, these elements should not be limited by these terms, and these terms are only used to distinguish one element from another. The terms of a singular form may include plural forms unless referred to the contrary. In addition, terms such as "include" or "comprise" specify features or the presence of stated elements, but do not exclude other features or elements.

Furthermore, in the embodiments, when a region or an element is referred to as being "above" or "on" another region or element, it can be directly on the other region or element, or intervening regions or elements may also be present.

In the drawings, the sizes of elements may be exaggerated for clarity. For example, in the drawings, the size or thickness of each element may be arbitrarily shown for illustrative purposes, and thus the present disclosure should not be construed as being limited thereto.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

Figure 1:
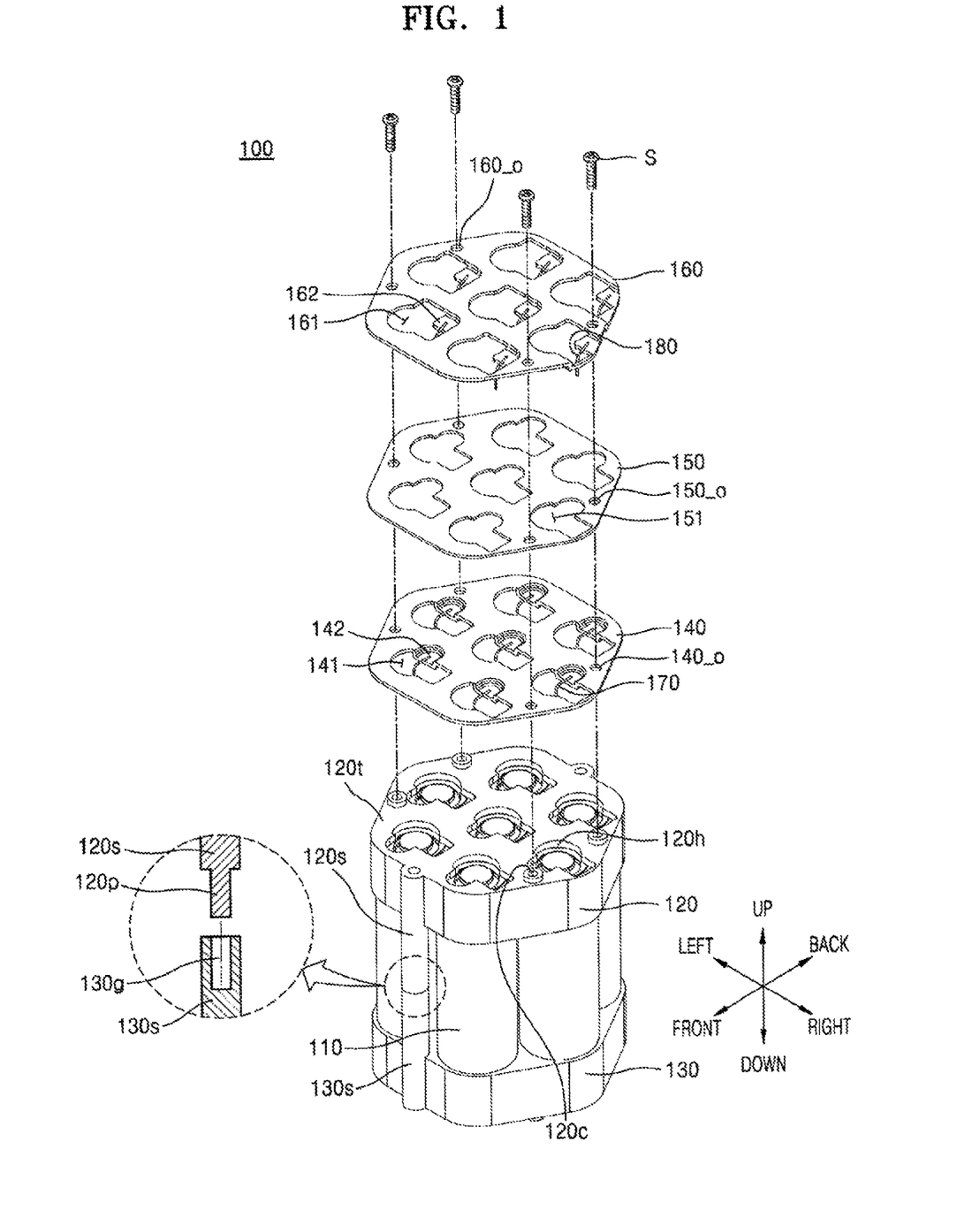
FIG. 1 is an exploded perspective view schematically illustrating a battery module according to an embodiment of the present disclosure.
Figure 2A:
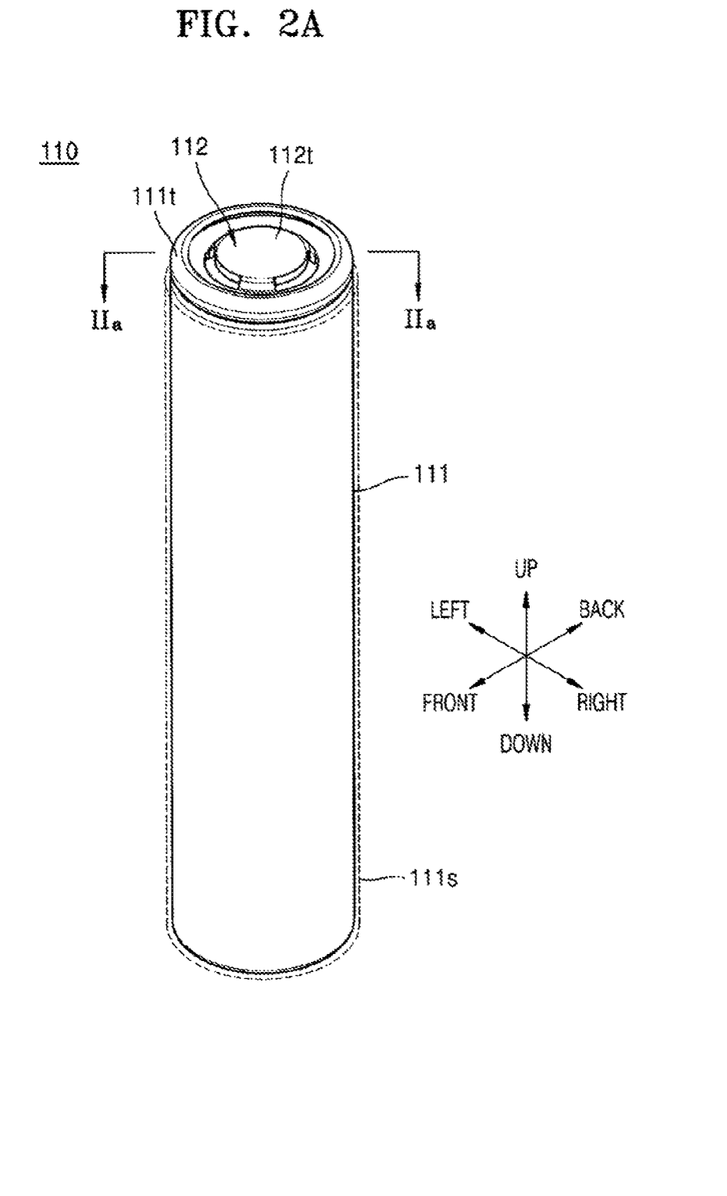
FIG. 2A is a perspective view illustrating one of battery cells illustrated in FIG. 1.

FIG. 1 is an exploded perspective view schematically illustrating a battery module according to an embodiment of the present disclosure; FIG. 2A is a perspective view illustrating one of battery cells illustrated in FIG. 2B is a cross-sectional view taken along line IIa-IIa of FIG. 2A; and FIG. 3 is an enlarged side view partially illustrating lateral sides of a first conductive plate, an insulative plate, and a second conductive plate which are illustrated in FIG. 1.

Referring to FIG. 1, a battery module 100 may include: a plurality of battery cells 110; a first housing 120 and a second housing 130 that are respectively arranged on upper and lower portions of the battery cells 110; a first conductive plate 140 and a second conductive plate 160 that are arranged on the upper portions of the battery cells 110; an insulative plate 150 that are arranged between the first conductive plate 140 and the second conductive plate 160; first connection tabs 170 that electrically connect the battery cells 110 to the first conductive plate 140; and second connection tabs 180 that electrically connect the battery cells 110 to the second conductive plate 160.

Figure 2B:
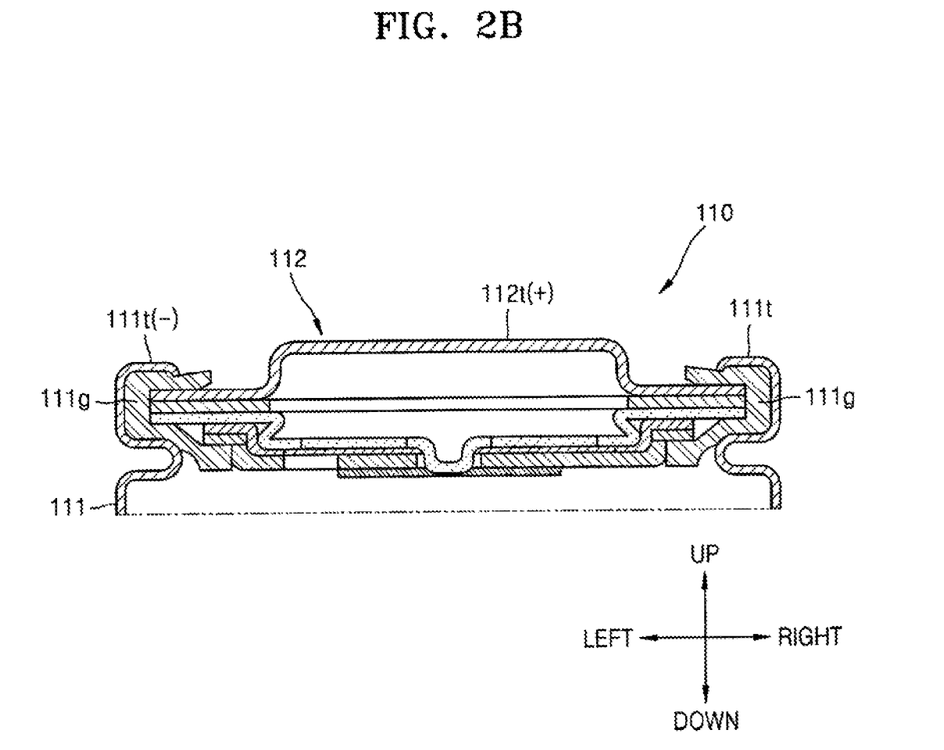
FIG. 2B is a cross-sectional view taken along line IIa-IIa of FIG. 2A.
Figure 3:
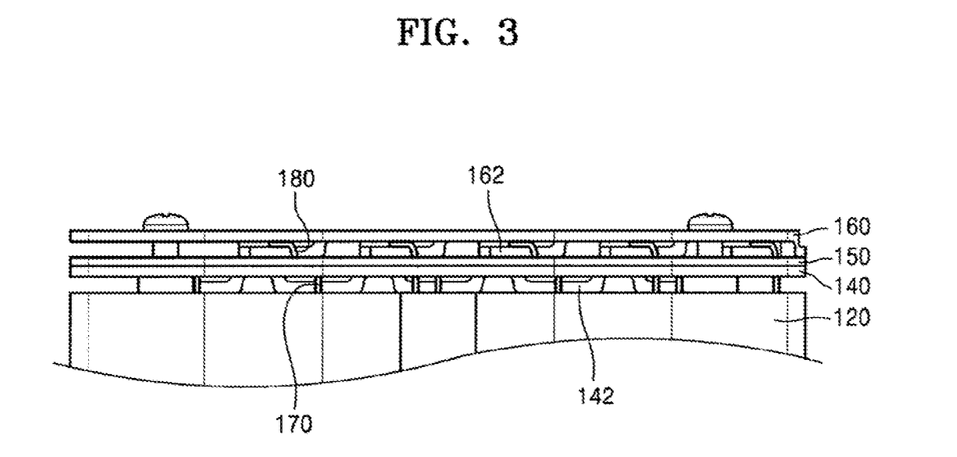
FIG. 3 is an enlarged side view partially illustrating lateral sides of a first conductive plate, an insulative plate, and a second conductive plate which are illustrated in FIG. 1.

Referring to FIGS. 1, 2A, and 2B, each of the battery cells 110 may include: a can 111 which accommodates an electrode assembly; and a cap plate 112 that covers an upper portion of the can 111. Although not shown in the drawings, the electrode assembly may include a negative electrode plate, a positive electrode plate, and a separator arranged between the negative and positive electrode plates, and the electrode assembly may be rolled in a cylindrical shape and accommodated in the can 111. For example, the positive electrode plate may be aluminum foil coated with a positive electrode active material such as lithium cobalt acid (LiCoO2), and the negative electrode plate may be copper foil coated with a negative electrode active material such as graphite. The separator may be provided between the negative electrode plate and the positive electrode plate to prevent an electrical short circuit between the negative electrode plate and the positive electrode plate while allowing movement of lithium ions therebetween.

The can 111 may have a cylindrical shape having an open side (for example, an open upper side). The can 111 may be formed of a conductive material such as steel, stainless steel, aluminum, or an equivalent thereof, but embodiments of the present disclosure are not limited thereto.

An upper portion 111t of the can 111 may be coupled to the cap plate 112 and may thus be sealed by the cap plate 112, and a gasket 111g formed of an insulative material is arranged between the upper portion 111t of the can 111 and the cap plate 112. The cap plate 112 may be formed of a conductive material such as steel, stainless steel, aluminum, or an equivalent thereof, but embodiments of the present disclosure are not limited thereto.

One of the negative electrode plate and the positive electrode plate of the electrode assembly may be electrically connected to the can 111, and the other may be electrically connected to the cap plate 112. Therefore, the upper portion 111t of the can 111 and an upper surface 112t of the cap plate 112 may be a negative electrode and a positive electrode, respectively. For ease of description, the following description will be given for the case in which the upper portion 111t of the can 111 and the upper surface 112t of the cap plate 112 are respectively a negative electrode and a positive electrode, and the upper portion 111t of the can 111 and the upper surface 112t of the cap plate 112 will be referred to as a negative electrode 111t and a positive electrode 112t, respectively.

At least a portion of the lateral surface of the can 111 may be covered with an insulative sheet 111s. The insulative sheet 111s may be a kind of film formed of an insulative material and may cover the lateral surface of the can 111 or may partially or entirely cover the lateral surface and bottom surface (which is opposite the cap plate 112) of the can 111.

As described above, according to embodiments of the present disclosure, the battery cells 110 may have a structure in which the negative electrodes 111t and the positive electrodes 112t of the battery cells 110 are exposed at the same side, that is, at the upper sides of the battery cells 110. For example, the positive electrodes 112t may be arranged on center portions of the upper surfaces of the battery cells 110, and the negative electrodes 111t may be arranged on peripheral portions of the upper surfaces of the battery cells 110.

Referring back to FIG. 1, the battery cells 110 may be arranged between the first housing 120 and the second housing 130 with the lateral surfaces of the battery cells 110 being parallel to each other. The battery cells 110 may be arranged such that both the negative electrode 111t and the positive electrode 112t of each of the battery cells 110 face upwards.

The first housing 120 and the second housing 130 may be arranged respectively on upper and lower sides of the battery cells 110 and may be coupled to each other. The first housing 120 arranged on the upper sides of the battery cells 110 may include an upper housing 120t, and the upper housing 120t may include holes 120h through which the negative electrodes 111t and the positive electrodes 112t arranged on the upper sides of the battery cells 110 are exposed.

In addition, a side housing 120s of the first housing 120 may be bent downward from the upper housing 120t and may include protrusions 120p extending toward the second housing 130. The protrusions 120p of the first housing 120 may be inserted into holes 130g of a side housing 130s of the second housing 130. Owing to this structure, the first housing 120 and the second housing 130 may be securely coupled to each other, and thus the battery cells 110 may be fixed to predetermined positions.

In addition, the first housing 120 may include coupling holes 120c which overlap the positions of openings 140_o, 150_o, and 160_o of the first conductive plate 140, the insulative plate 150, and the second conductive plate 160. Screws S may be inserted into the openings 140_o, 150_o, and 160_o, and the coupling holes 120c. That is, the screws S may be inserted sequentially through the second conductive plate 160, the insulative plate 150, the first conductive plate, and the first housing 120, and thus the second conductive plate 160, the insulative plate 150, the first conductive plate, and the first housing 120 may be coupled to each other.

The first conductive plate 140 may be provided at end portions of the battery cells 110 and may be adjacent to the negative electrodes 111t and the positive electrodes 112t. The first conductive plate 140 may include: first through-holes 141 through which the negative electrodes 111t and the positive electrodes 112t of the battery cells 110 are exposed; and first stepped portions 142 which are adjacent to the first through-holes 141 and are recessed (downward) toward the battery cells 110.

That is, the first conductive plate 140 may be provided on the upper side of the first housing 120, for example, on the upper housing 120t. The first conductive plate 140 may be arranged in left and right directions under the insulative plate 150 (described later), for example, between the insulative plate 150 and the battery cells 110.

The insulative plate 150 is arranged on the first conductive plate 140 and may include second through-holes 151 which overlap the first through-holes 141 of the first conductive plate 140 at least partially in a vertical direction. That is, the insulative plate 150 may be arranged between the first conductive plate 140 and the second conductive plate 160 (described later).

In detail, the insulative plate 150 may entirely overlap at least the second conductive plate 160 to prevent direct contact between the first conductive plate 140 and the second conductive plate 160.

The second conductive plate 160 may be arranged on the insulative plate 150, and the second conductive plate 160 may include: third through-holes 161 which at least partially overlap the second through-holes 151 of the insulative plate 150; and second stepped portions 162 which are adjacent to the third through-holes 161 and are recessed (downward) toward the insulative plate 150.

In detail, the first conductive plate 140 and the second conductive plate 160 may be offset such that portions of the first conductive plate 140 and the second conductive plate 160 overlap each other in the left and right directions in FIG. 1. For example, the second conductive plate 160 may be offset in the left and right directions such that the second conductive plate 160 may overlap both the insulative plate 150 and the first conductive plate 140 that neighbor each other.

The first connection tabs 170 may electrically connect the negative electrodes 111*t* or the positive electrodes 112*t* of the battery cells 110 to the first stepped portions 142 of the first conductive plate 140. Although the first connection tabs 170 are illustrated in the drawings as electrically connecting the first stepped portions 142 of the first conductive plate 140 to the positive electrodes 112*t* of the battery cells 110, embodiments of the present disclosure are not limited thereto. For example, the first connection tabs 170 may electrically connect the first stepped portions 142 of the first conductive plate 140 to the negative electrodes 111*t* of the battery cells 110. However, hereinafter, the structure in which the first connection tabs 170 electrically connect the first stepped portions 142 to the positive electrodes 112*t* as shown in FIGS. 1 and 3 will be mainly described. In addition, possible modifications will be described in more detail when another embodiment of the present disclosure is described with reference to FIG. 7.

The second connection tabs 180 may electrically connect the negative electrodes 111*t* or the positive electrodes 112*t* of the battery cells 110, which are not electrically connected to the first connection tabs 170, to the second stepped portions 162 of the second conductive plate 160. Although the second connection tabs 180 are illustrated in the drawings as electrically connecting the second stepped portions 162 of the second conductive plate 160 to the negative electrodes 111*t* of the battery cells 110, embodiments of the present disclosure are not limited thereto. For example, the second connection tabs 180 may electrically connect the second stepped portions 162 of the second conductive plate 160 to the positive electrodes 112*t* of the battery cells 110. However, hereinafter, the structure in which the second connection tabs 180 electrically connect the second stepped portions 162 to the negative electrodes 111*t* as shown in FIGS. 1 and 3 will be mainly described. In addition, possible modifications will be described in more detail when another embodiment of the present disclosure is described with reference to FIG. 7.

In addition, the first connection tabs 170 and the second connection tabs 180, which electrically connect the battery cells 110 to the first conductive plate 140 and to the second conductive plate 160, may function as fusible links such that when an excessive current flows, the first connection tabs 170 and the second connection tabs 180 may melt and may break electrical connection between the battery cells 110 and the first conductive plate 140 and electrical connection between the battery cells 110 and the second conductive plate 160.

In addition, referring to FIG. 3, the first connection tabs 170, which electrically connect the first stepped portions 142 to the positive electrodes 112*t*, do not penetrate the first through-holes 141 or do not overlap the first through-holes 141 in the left and right directions because the first stepped portions 142 are lower than the first through-holes 141.

According to this structure, the possibility that the first connection tabs 170 are brought into contact with the insulative plate 150 or the second conductive plate 160 provided above the first conductive plate 140 is fundamentally eliminated, and thus when the battery module 100 is manufactured or used, a charge and discharge circuit of the battery module 100 may not be electrically shorted due to contact between the first connection tabs 170 and the second conductive plate 160.

In addition, the second connection tabs 180, which electrically connect the second stepped portions 162 to the negative electrodes 111*t*, do not penetrate the third through-holes 161 or do not overlap the third through-holes 161 in the left and right directions because the second stepped portions 162 are lower than the third through-holes 161.

Figure 4:
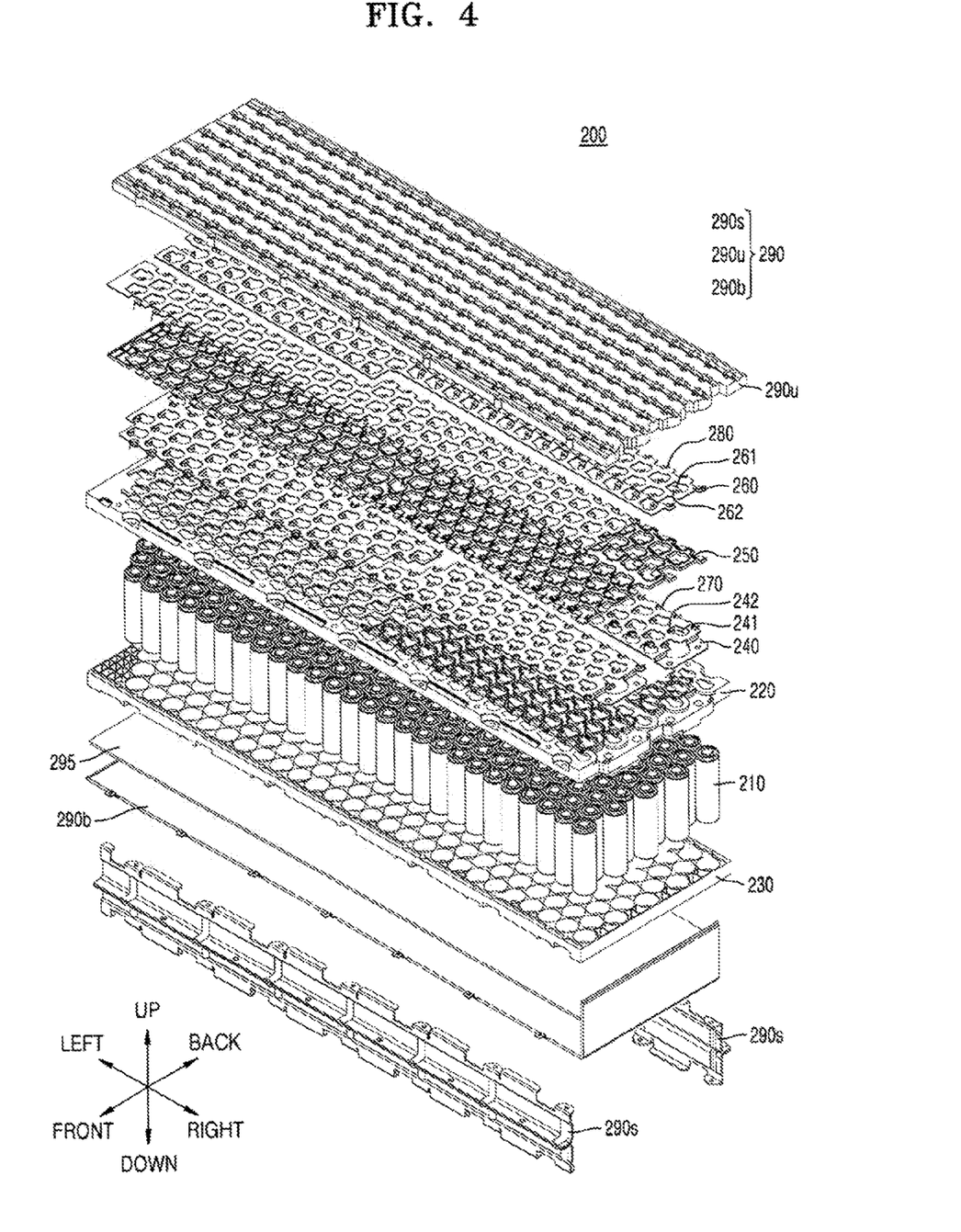
FIG. 4 is an exploded perspective view schematically illustrating a battery module according to another embodiment of the present disclosure.

This structure fundamentally eliminates the possibility that the second connection tabs 180 are brought into contact with an upper cover (not shown, refer to not the same but a similar upper cover 290*u* shown in FIG. 4) provided above the second conductive plate 160 when the battery module 100 is assembled, and thus when the battery module 100 is manufactured or used, the second connection tabs 180 may be prevented from being deformed or fractured in severe cases by an external impact force.

In addition, the first conductive plate 140 and the second conductive plate 160 may electrically connect the battery cells 110 in series and/or in parallel to each other by using the first connection tabs 170 and the second connection tabs 180. In other words, the battery cells 110 may be electrically connected to each other through the first connection tabs 170 and the second connection tabs 180. To this end, the first conductive plate 140, the second conductive plate 160, the first connection tabs 170, and the second connection tabs 180 may include a conductive material such as aluminum, copper, nickel, titanium, or an alloy thereof. However, embodiments of the present disclosure are not limited thereto, and may include equivalents thereof.

In addition, FIGS. 1 and 3 illustrate the structure in which the battery cells 110 are connected in parallel to each other by the first connection tabs 170, the second connection tabs 180, the first conductive plate 140, and the second conductive plate 160. However, embodiments of the present disclosure are not limited thereto. In this regard, another embodiment will be described in detail with reference to FIGS. 4 to 9.

Although not shown in the drawings, in some embodiments of the present disclosure, the battery module 100 may further include a protective circuit module (not shown). The protective circuit module may be arranged on the first conductive plate 140 and the second conductive plate 160 to overlap the first conductive plate 140 and the second conductive plate 160. The protective circuit module may be electrically connected to the battery cells 110 through the first conductive plate 140 and the second conductive plate 160 to control the charge and discharge operations of the battery cells 110 and may prevent the battery cells 110 from overheating or exploding due to overdischarge, overdischarge, or an overcurrent.

In addition, the upper cover (not shown, refer to not the same but a similar upper cover 290u shown in FIG. 4) may be further provided above the protective circuit module. The upper cover may cover all the first conductive plate 140, the second conductive plate 160, and the protective circuit module and may protect the battery module 100 from external conductors and foreign substances.

Furthermore, in some embodiments of the present disclosure, the battery module 100 may further include a cooling member 295 (refer to FIG. 9) that is provided at the other end portions of the battery cells 110 which are opposite the end portions on which the first conductive plate 140, the insulative plate 150, and the second conductive plate 160 are arranged. That is, the cooling member 295 may be provided on the lower portions of the battery cells 110. In an embodiment, the cooling member 295 may include a thermally conductive plate 295p (refer to FIG. 9). For example, the thermally conductive plate 295p may be an anodized aluminum plate. In addition, the cooling member 295 may include a flow path 295f (refer to FIG. 9) through which a cooling fluid flows.

Figure 5:
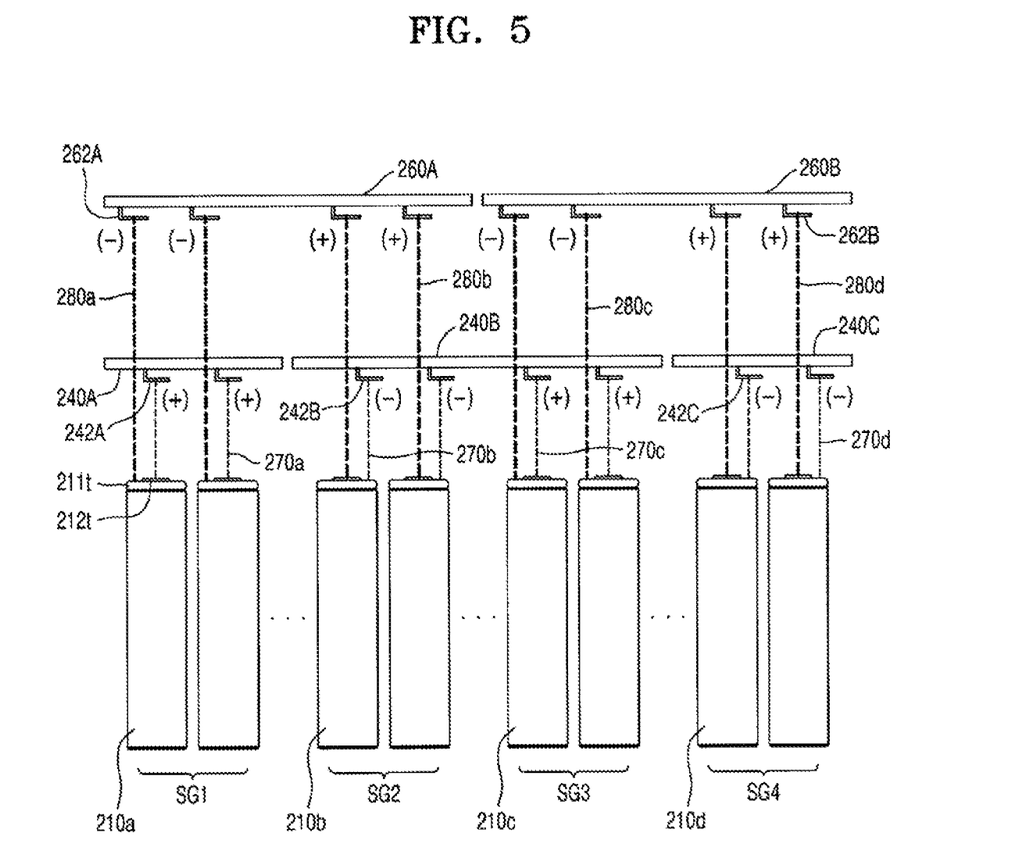
FIG. 5 is a schematic view illustrating electrical connection of battery cells, first conductive plates, and second conductive plates which are illustrated in FIG. 4.
Figure 6:
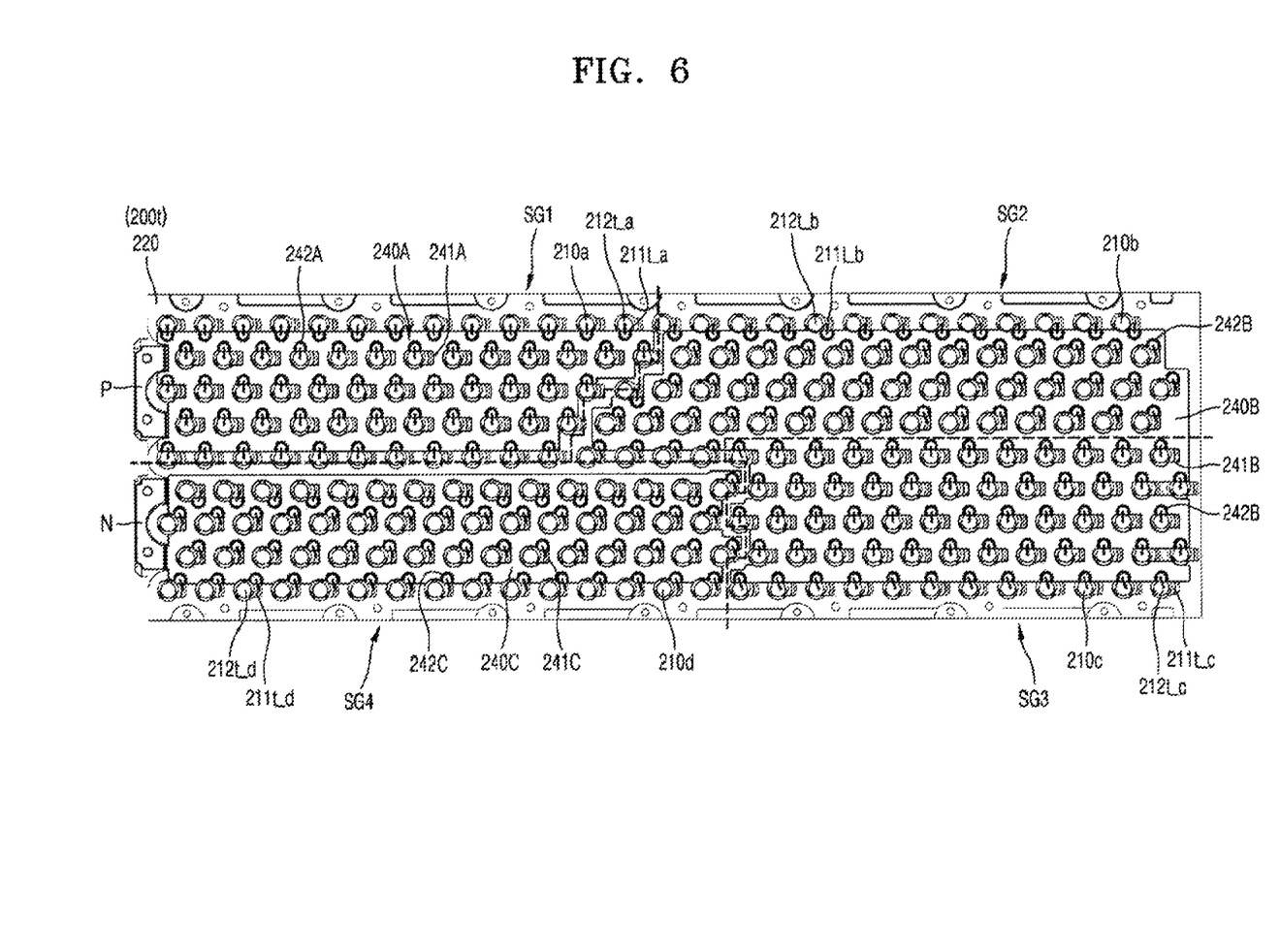
FIG. 6 is a plan view illustrating arrangement of the first conductive plates.
Figure 7:
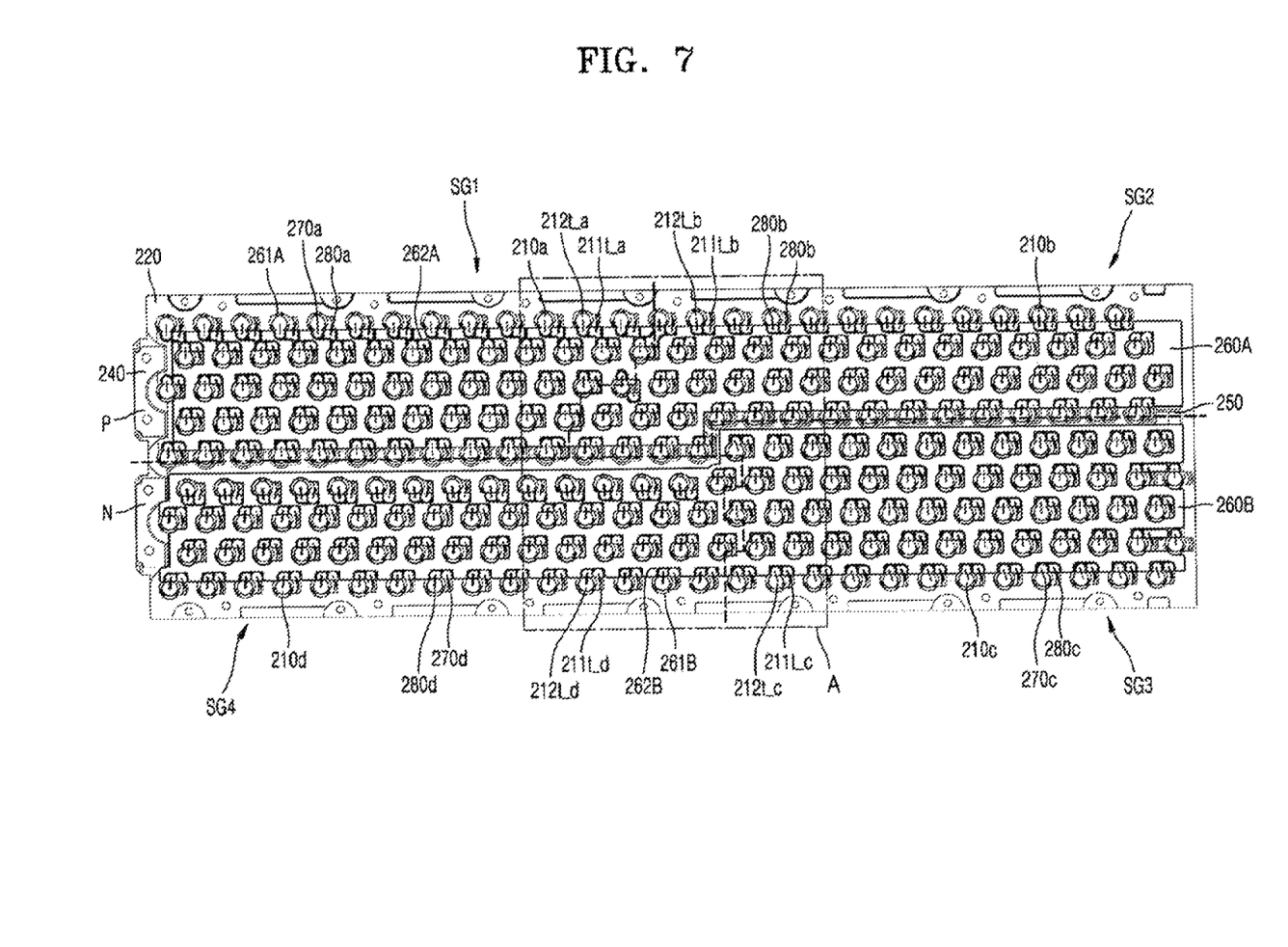
FIG. 7 is a plan view illustrating arrangement of the second conductive plates.
Figure 8:
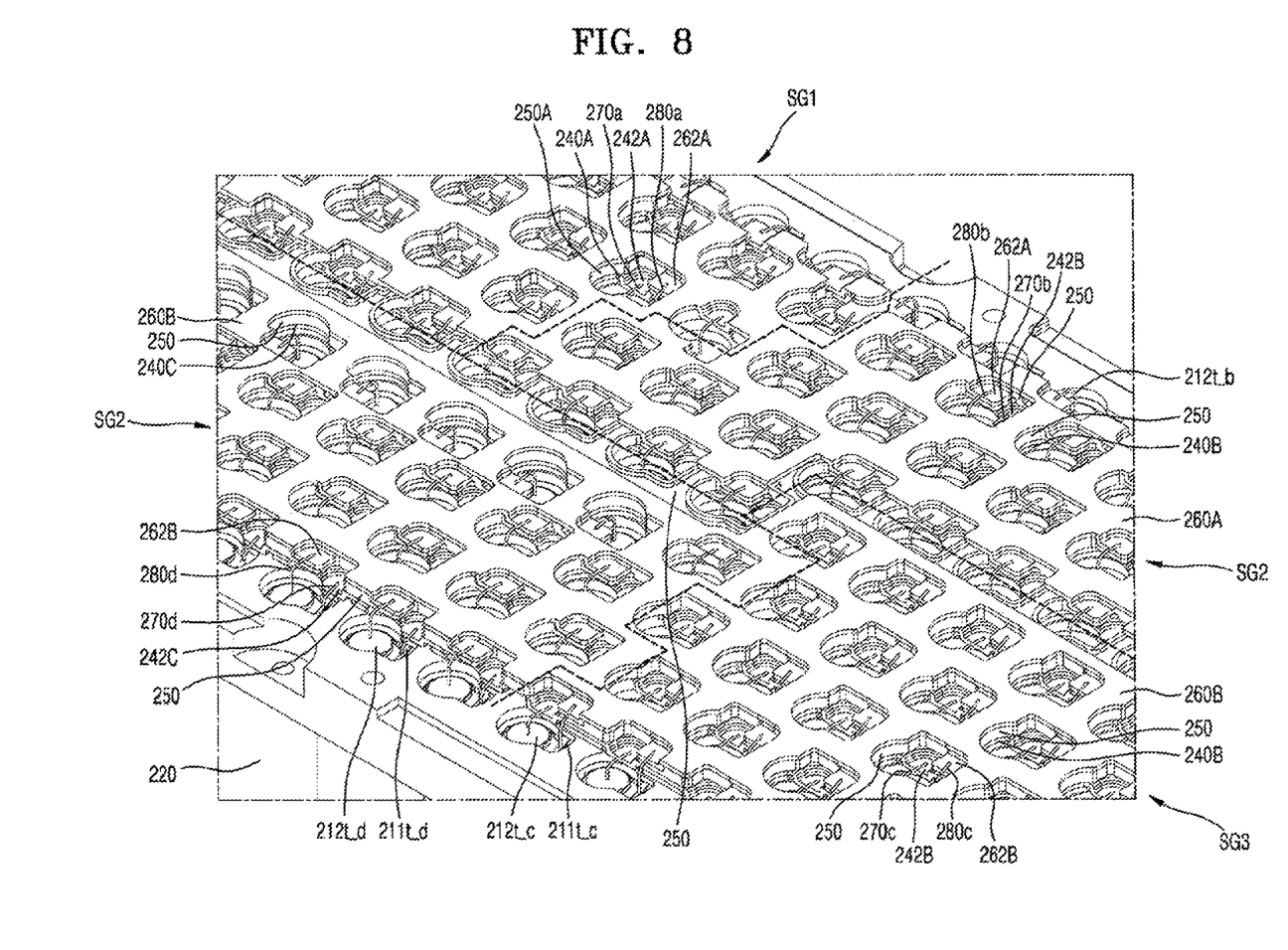
FIG. 8 is an enlarged perspective view illustrating a portion A of FIG. 7.

FIG. 4 is an exploded perspective view schematically illustrating a battery module according to another embodiment of the present disclosure; FIG. 5 is a schematic view illustrating electrical connection of battery cells, first conductive plates, and second conductive plates which are illustrated in FIG. 6 is a plan view illustrating arrangement of the first conductive plates, and FIG. 7 is a plan view illustrating arrangement of the second conductive plates; FIG. 8 is an enlarged perspective view illustrating a portion A in FIG. 7, and illustrating an assembled state of the battery cells, the first conductive plates, the second conductive plates, first connection tabs, and second connection tabs that are illustrated in FIG. 4.

Referring to FIG. 4, a battery module 200 according to another embodiment of the present disclosure may include: a plurality of battery cells 210; a first housing 220 and a second housing 230 that are respectively arranged on upper and lower portions of the battery cells 210; first conductive plates 240 and second conductive plates 260 that are arranged on the upper portions of the battery cells 210; an insulative plate 250 that is arranged between the first conductive plates 240 and the second conductive plates 260; first connection tabs 270 that electrically connect the battery cells 210 to the first conductive plates 240; second connection tabs 280 that electrically connect the battery cells 210 to the second conductive plates 260; a casing 290 including side covers 290s, a base cover 290b, and an upper cover 290u; and a cooling member 295.

Here, the elements of the battery module 200 are the same as or similar to those of the battery module 100 of the embodiment described with reference to FIGS. 1 to 3 except for the battery cells 210, the first conductive plates 240, the insulative plate 250, and the second conductive plates 260, and thus the previous descriptions of the same or similar elements may be referred to. Hereinafter, structures of the battery cells 210, the first conductive plates 240, the insulative plate 250, and the second conductive plates 260 will be described in detail with reference to FIGS. 5 to 9.

Dashed lines shown in FIG. 5 refer to electrical connection. In FIG. 5, for ease of description, an embodiment in which three first conductive plates 240 are provided (refer to FIG. 6) and two second conductive plates 260 are provided (refer to FIG. 7) will be described.

Referring to FIGS. 5 and 6, the battery cells 210 include a plurality of first sub-battery cells 210a, a plurality of second sub-battery cells 210b, a plurality of third sub-battery cells 210c, and a plurality of fourth sub-battery cells 210d.

In addition, sequentially in a left-to-right direction, the first conductive plates 240 may include a first-first conductive plate 240A, a first-second conductive plate 240B, and a first-third conductive plate 240C. In addition, sequentially in the left-to-right direction, the second conductive plates 260 may include a second-first conductive plate 260A and a second-second conductive plate 260B.

Hereinafter, unless otherwise specified, a first conductive plate 240 refers to any one of the first-first conductive plate 240A, the first-second conductive plate 240B, and the first-third conductive plate 240C, and a second conductive plate 260 refers to any one of the second-first conductive plate 260A and the second-second conductive plate 260B.

Referring to FIG. 5, the first and second conductive plates 240 and 260 may be arranged on the upper portions of the battery cells 210, and may be offset by a predetermined distance in left and right directions (parallel to surfaces of the first and second conductive plates 240 and 260) such that the first and second conductive plates 240 and 260 may partially overlap each other. For example, each of the second conductive plates 260 may be offset such that the second conductive plate 260 may overlap two neighboring first conductive plates 240.

In detail, a region of the second-first conductive plate 260A may overlap the first-first conductive plate 240A, and the other region of the second-first conductive plate 260A may overlap the first-second conductive plate 240B. In addition, a region of the second-second conductive plate 260B may overlap the first-second conductive plate 240B, and the other region of the second-second conductive plate 260B may overlap the first-third conductive plate 240C.

Among the battery cells 210, the first sub-battery cells 210a of a first sub-group SG1, which overlap, for example, the first-first conductive plate 240A and the second-first conductive plate 260A, may be electrically connected to the first-first conductive plate 240A and the second-first conductive plate 260A. Specifically, negative electrodes 211t of the first sub-battery cells 210a may be electrically connected to second stepped portions 262A formed on the second-first conductive plate 260A, and positive electrodes 212t of the first sub-battery cells 210a may be electrically connected to first stepped portions 242A formed on the first-first conductive plate 240A.

Among the battery cells 210, the second sub-battery cells 210b of a second sub-group SG2, which overlap, for example, the first-second conductive plate 240B and the second-first conductive plate 260A, may be electrically connected to the first-second conductive plate 240B and the second-first conductive plate 260A. Specifically, negative electrodes 211t of the second sub-battery cells 210b may be electrically connected to first stepped portions 242B formed on the first-second conductive plate 240B, and positive electrode 212t of the second sub-battery cells 210b may be electrically connected to second stepped portions 262A formed on the second-first conductive plate 260A.

Among the battery cells 210, the third sub-battery cells 210c of a third sub-group SG3, which overlap, for example, the first-second conductive plate 240B and the second-second conductive plate 260B, may be electrically connected to the first-second conductive plate 240B and the second-second conductive plate 260B. Specifically, negative electrodes 211t of the third sub-battery cells 210c may be electrically connected to second stepped portions 262B formed on the second-second conductive plate 260B, and positive electrode 212*t* of the third sub-battery cells 210*c* may be electrically connected to first stepped portions 242B formed on the first-second conductive plate 240B.

Among the battery cells 210, the fourth sub-battery cells 210*d* of a fourth sub-group SG4, which overlap, for example, the first-third conductive plate 240C and the second-second conductive plate 260B, may be electrically connected to the first-third conductive plate 240C and the second-second conductive plate 260B. Specifically, negative electrodes 211*t* of the fourth sub-battery cells 210*d* may be electrically connected to first stepped portions 242C formed on the first-third conductive plate 240C, and positive electrode 212*t* of the fourth sub-battery cells 210*d* may be electrically connected to second stepped portions 262B formed on the second-second conductive plate 260B.

The first-second conductive plate 240B arranged in the middle of the first conductive plates 240 may electrically connect battery cells included in a sub-group (the battery cells 210*b* or 210*c* of the second sub-group SG2 or the third sub-group SG3 in FIG. 5) in parallel to each other, and may electrically connect the battery cells 210*b* and 210*c* of the neighboring sub-groups (the second sub-group SG2 and the third sub-group SG3 in FIG. 5) in series to each other.

However, each of the first-first conductive plate 240A and the first-third conductive plate 240C which are arranged on peripheral sides of the first conductive plates 240 may electrically connect the battery cells 210*a* or 210*d* included in a sub-group (the first sub-group SG1 or the fourth sub-group SG4 in FIG. 5) in parallel to each other.

Similarly, the second conductive plates 260, for example, the second-first conductive plate 260A may electrically connect the battery cells 210*a* or 210*b* included in a sub-group (the first sub-group SG1 or the second sub-group SG2 in FIG. 5) in parallel to each other, and may electrically connect the battery cells 210*a* and 210*b* of the neighboring sub-groups (the first sub-group SG1 and the second sub-group SG2 in FIG. 5) in series to each other.

In addition, the second-second conductive plate 260B may electrically connect the battery cells 210*c* or 210*d* of one sub-group (the third sub-group SG3 or the fourth sub-group SG4 in FIG. 5) in parallel to each other, and may electrically connect the battery cells 210*c* and 210*d* of the neighboring sub-groups (the third sub-group SG3 and the fourth sub-group SG4 in FIG. 5) in series to each other.

FIG. 6 is a plan view illustrating arrangement of the first conductive plates.

Referring to FIG. 6, the first conductive plates 240 may include the first-first conductive plate 240A, the first-second conductive plate 240B, and the first-third conductive plate 240C as described with reference to FIG. 5. Each of the first conductive plates 240 may include: first through-holes 241 through which the negative electrodes 211*t* and the positive electrodes 212*t* of the battery cells 210 are exposed; and first stepped portions 242 which are adjacent to the first through-holes 241 and are recessed toward the battery cells 210.

As described with reference to FIG. 5, the first-first conductive plate 240A may be arranged to overlap the first sub-battery cells 210*a* of the first sub-group SG1; the first-second conductive plate 240B may be arranged to overlap the second sub-battery cells 210*b* of the second sub-group SG2 and the third sub-battery cells 210*c* of the third sub-group SG3; and the first-third conductive plate 240C may be arranged to overlap the fourth sub-battery cells 210*d* of the fourth sub-group SG4.

FIG. 7 is a plan view illustrating arrangement of the second conductive plates.

Referring to FIG. 7, the second conductive plates 260 may include the second-first conductive plate 260A and the second-second conductive plate 260B as described with reference to FIG. 5. Each of the second conductive plates 260 may include: third through-holes 261 through the negative electrodes 211*t* and the positive electrodes 212*t* of the battery cells 210 are exposed; and second stepped portions 262 which are adjacent to the third through-holes 261 and are recessed toward the insulative plate 250.

As described with reference to FIG. 5, the second-first conductive plate 260A may be arranged to overlap the first sub-battery cells 210*a* of the first sub-group SG1 and the second sub-battery cells 210*b* of the second sub-group SG2, and the second-second conductive plate 260B may be arranged to overlap the third sub-battery cells 210*c* of the third sub-group SG3 and the fourth sub-battery cells 210*d* of the fourth sub-group SG4.

In addition, FIG. 8 is an enlarged perspective view illustrating a portion A of FIG. 7.

FIG. 8 illustrates a state in which the insulative plate 250 is arranged between the first conductive plates 240 and the second conductive plates 260.

Hereinafter, the first connection tabs 270 and the second connection tabs 280 will be described in detail with reference to FIGS. 6 to 8.

Referring to FIGS. 6 to 8, as described above, the battery cells 210 may be grouped into the first sub-battery cells 210*a* of the first sub-group SG1, the second sub-battery cells 210*b* of the second sub-group SG2, the third sub-battery cells 210*c* of the third sub-group SG3, and the fourth sub-battery cells 210*d* of the fourth sub-group SG4. The first to fourth sub-battery cells 210*a* to 210*d* may be of the same type except that the first to fourth sub-battery cells 210*a* to 210*d* are electrically connected to the first conductive plates 240 and the second conductive plates 260 by different methods.

In detail, negative electrodes 211*t*_a of the first sub-battery cells 210*a* of the first sub-group SG1 may be electrically connected to the second stepped portions 262A formed on the second-first conductive plate 260A through second connection tabs 280*a*. In addition, positive electrodes 212t_a of the first sub-battery cells 210*a* of the first sub-group SG1 may be electrically connected to the first stepped portions 242A formed on the first-first conductive plate 240A through first connection tabs 270*a*.

In addition, negative electrodes 211t_b of the second sub-battery cells 210*b* of the second sub-group SG2 may be electrically connected to the first stepped portions 242B formed on the first-second conductive plate 240B through first connection tabs 270*b*. In addition, positive electrodes 212t_b of the second sub-battery cells 210*b* of the second sub-group SG2 may be electrically connected to the second stepped portions 262A formed on the second-first conductive plate 260A through second connection tabs 280*b*.

In addition, negative electrodes 211t_c of the third sub-battery cells 210*c* of the third sub-group SG3 may be electrically connected to the second stepped portions 262B formed on the second-second conductive plate 260B through second connection tabs 280*c*. In addition, positive electrodes 212t_c of the third sub-battery cells 210*c* of the third sub-group SG3 may be electrically connected to the first stepped portions 242B formed on the first-second conductive plate 240B through first connection tabs 270*c*.

In addition, negative electrodes 211t_d of the fourth sub-battery cells 210*d* of the fourth sub-group SG4 may be electrically connected to the first stepped portions 242C formed on the first-third conductive plate 240C through first connection tabs 270d. In addition, positive electrodes 212t_d of the fourth sub-battery cells 210d of the fourth sub-group SG4 may be electrically connected to the second stepped portions 262B formed on the second-second conductive plate 260B through second connection tabs 280d.

Therefore, in summary, the first connection tabs 270 may connect: the positive electrodes 212t_a of the first sub-battery cells 210a to the first stepped portions 242A of the first-first conductive plate 240A; the negative electrodes 211t_b of the second sub-battery cells 210b to the first stepped portions 242B of the first-second conductive plate 240B; the positive electrodes 212t_c of the third sub-battery cells 210c to the first stepped portions 242B of the first-second conductive plate 240B; and the negative electrodes 211t_d of the fourth sub-battery cells 210d to the first stepped portions 242C of the first-third conductive plate 240C.

Therefore, the first connection tabs 270, which electrically connect the first stepped portions 242 to the negative electrodes 211t or the positive electrodes 212t of the battery cells 210, do not penetrate the first through-holes 241 or does not overlap the first through-holes 241 in the left and right directions because the first stepped portions 242 are lower than the first through-holes 241.

According to this structure, the possibility that the first connection tabs 270 are brought into contact with the insulative plate 250 or the second conductive plate 260 provided above the first conductive plate 240 is fundamentally eliminated, and thus when the battery module 200 is manufactured or used, a charge and discharge circuit of the battery module 200 may not be electrically shorted due to contact between the first connection tabs 270 and the second conductive plate 260.

In addition, the second connection tabs 280 may connect: the negative electrodes 211t_a of the first sub-battery cells 210a to the second stepped portions 262A of the second-first conductive plate 260A; the positive electrodes 212t_b of the second sub-battery cells 210b to the second stepped portions 262B of the second-first conductive plate 260A; the negative electrodes 211t_c of the third sub-battery cells 210c to the second stepped portions 262B of the second-second conductive plate 260B; and the positive electrodes 212t_d of the fourth sub-battery cells 210d to the second stepped portions 262B of the second-second conductive plate 260B.

Therefore, the second connection tabs 280, which electrically connect the second stepped portions 262 to the negative electrodes 211t or the positive electrodes 212t of the battery cells 210, do not penetrate the third through-holes 261 or does not overlap the third through-holes 261 in the left and right directions because the second stepped portions 262 are lower than the third through-holes 261.

This structure fundamentally eliminates the possibility that the second connection tabs 280 are brought into contact with the upper cover 290u provided above the second conductive plate 260, and thus when the battery module 200 is manufactured or used, the second connection tabs 280 may be prevented from being deformed or fractured in severe cases by an external impact force.

In addition, as shown in FIG. 6, the first-first conductive plate 240A may include a positive terminal P exposed to the outside of an upper housing 220t, that is, to the outside of the battery module 200, and the first-third conductive plate 240C may include a negative terminal N exposed to the outside of the upper housing 220t, that is, to the outside of the battery module 200. In the sense in which the battery cells 210 included in the battery module 200 of the embodiment are electrically connected to each other and function as one battery, the positive terminal P and the negative terminal N may be considered as a positive electrode and a negative electrode of one battery module 200.

Figure 9:
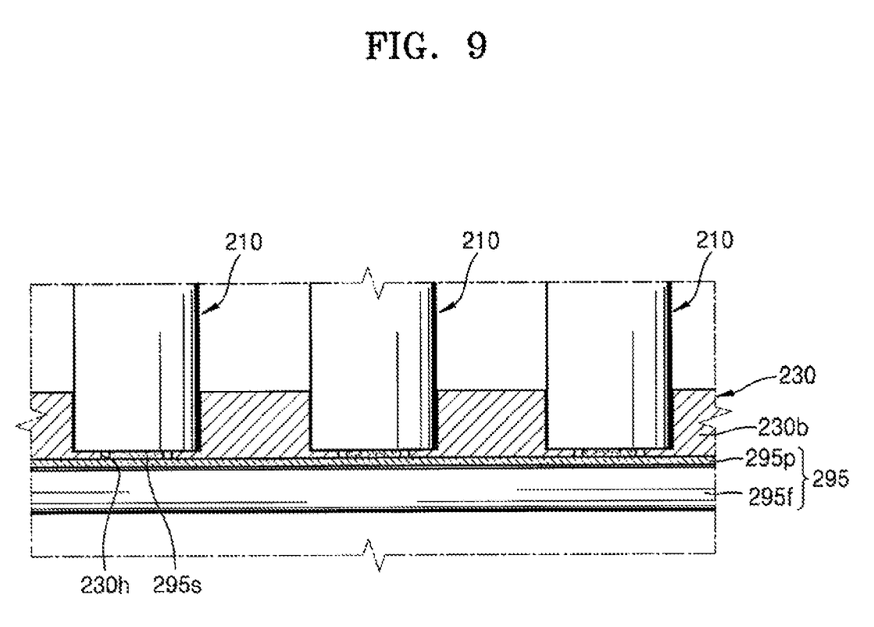
FIG. 9 is a cross-sectional view illustrating a lower portion of the battery module according to an embodiment of the present disclosure.

FIG. 9 is a cross-sectional view illustrating a lower portion of the battery module according to an embodiment of the present disclosure.

Referring to FIG. 9, the cooling member 295 may be arranged under the battery cells 210. The cooling member 295 may include the thermally conductive plate 295p and the flow path 295f through which a cooling fluid flows. Lower surfaces of the battery cells 210 may be exposed through holes 230h formed in a lower housing 230b of the second housing 230.

The thermally conductive plate 295p may include a thermally conductive material such as an anodized aluminum tube as described above and may be thermally connected to the lower surfaces of the battery cells 210 through a thermal conductor such as thermally conductive silicone 295s.

The flow path 295f may be arranged below the thermally conductive plate 295p, and the cooling fluid may flow through the flow path 295f to cool the battery cells 210. Here, a liquid such as water or a gas such as air may be the cooling fluid.

Although FIG. 9 illustrates the case in which the cooling member 295 includes both the thermally conductive plate 295p and the flow path 295f through which the cooling fluid flows, embodiments of the present disclosure are not limited thereto. For example, the cooling member 295 may include only one of the thermally conductive plate 295p and the flow path 295f through which a cooling fluid flows.

While embodiments of the present disclosure have been described with reference to the accompanying drawings, these embodiments are for illustrative purposes only, and it will be understood by those of ordinary skill in the art that various changes and modifications may be made therefrom. Therefore, the scope of the present disclosure should be defined by the following claims.

INDUSTRIAL APPLICABILITY

As described above, embodiments of the present disclosure provide mechanically and electrically stable battery modules.

The invention claimed is:
1. A battery module comprising:
a plurality of battery cells comprising negative and positive electrodes on one side;
a first conductive plate provided at end portions of the plurality of battery cells and adjacent to the negative and positive electrodes, the first conductive plate comprising first through-holes through which the negative and positive electrodes of the plurality of battery cells are respectively exposed and first stepped portions which are adjacent to the first through-holes and are recessed toward the plurality of battery cells;
an insulative plate arranged on the first conductive plate and comprising second through-holes which at least partially overlap the first through-holes;
a second conductive plate arranged on the insulative plate, the second conductive plate comprising third through-holes which at least partially overlap the second through-holes and second stepped portions which are adjacent to the third through-holes and are recessed toward the insulative plate;

first connection tabs electrically connecting the positive electrodes or the negative electrodes to the first stepped portions;

second connection tabs electrically connecting the others of the positive electrodes and the negative electrodes to the second stepped portions;

a third conductive plate adjacent to the first conductive plate; and a fourth conductive plate adjacent to the second conductive plate, wherein:

the third conductive plate includes fourth through-holes and a third stepped portion formed adjacent to each of the fourth through-holes, and each third stepped portion has a first connection tab attached thereto, the fourth conductive plate includes fifth through-holes and a fourth stepped portion formed adjacent to each of the fifth through-holes, and each fourth stepped portion has a second connection tab attached thereto, the second conductive plate electrically connects a first battery cell and a second battery cell of the plurality of battery cells in series, the first battery cell has a first electrode in contact with a first connection tab of the first conductive plate and has a second electrode in contact with a second connection tab of the second conductive plate, and the second battery cell has a first electrode in contact with a second connection tab of the second conductive plate and has a second electrode in contact with a first connection tab of the third conductive plate.

* * * * *